United States Patent
Jaldén et al.

(10) Patent No.: US 10,348,381 B2
(45) Date of Patent: Jul. 9, 2019

(54) ANTENNA SYSTEM CONFIGURATION

(71) Applicant: Telefonaktiebolaget LM Ericsson (publ), Stockholm (SE)

(72) Inventors: Niklas Jaldén, Enköping (SE); Henrik Asplund, Stockholm (SE); David Astely, Bromma (SE); Fredrik Athley, Kullavik (SE); Andreas Nilsson, Göteborg (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/770,422

(22) PCT Filed: Nov. 23, 2015

(86) PCT No.: PCT/EP2015/077310
§ 371 (c)(1),
(2) Date: Apr. 23, 2018

(87) PCT Pub. No.: WO2017/088896
PCT Pub. Date: Jun. 1, 2017

(65) Prior Publication Data
US 2018/0316402 A1  Nov. 1, 2018

(51) Int. Cl.
*H04B 7/08* (2006.01)
*H04B 7/06* (2006.01)
*H04B 17/10* (2015.01)

(52) U.S. Cl.
CPC ......... *H04B 7/0617* (2013.01); *H04B 7/0626* (2013.01); *H04B 7/086* (2013.01); *H04B 17/101* (2015.01)

(58) Field of Classification Search
CPC .......... H04B 3/32; H04B 3/23; H04B 7/0478; H04B 7/0639; H04B 7/0695; H04B 7/10;
(Continued)

(56) References Cited

U.S. PATENT DOCUMENTS 7,667,652 B2 *  2/2010  Gevargiz ............. H01Q 1/2216
                                                343/700 MS
7,873,326 B2 *  1/2011  Sadr ..................... G06K 7/0008
                                                455/67.16
(Continued)

FOREIGN PATENT DOCUMENTS

WO  2013156065 A1  10/2013
WO  2014107020 A1   7/2014
WO  2014193475 A1  12/2014

OTHER PUBLICATIONS

International Search Report and Written Opinion dated Aug. 1, 2016 for International Application No. PCT/EP2015/077310 filed on Nov. 23, 2015, consisting of 11-pages.
(Continued)

*Primary Examiner* — James M Perez
(74) *Attorney, Agent, or Firm* — Christopher & Weisberg, P.A.

(57) ABSTRACT

There is provided mechanisms for configuring an antenna system having individual antenna elements arranged in at least two antenna subarrays. Each pair of antenna subarrays has a respective first spatial separation. Each pair of the individual antenna elements has a respective second spatial separation. A method is performed by a network device. The method includes obtaining channel measurements for each of the at least two antenna subarrays. Channel covariance information between the subarrays using the obtained channel measurements is determined. Channel covariance information between all individual antenna elements of the antenna system is determined by interpolating the channel covariance information between the subarrays according to a spatial relation between all first spatial separations and all second spatial separations. Combining of the individual antenna elements of the antenna system is controlled based
(Continued)

on the determined channel covariance information between all the individual antenna elements.

22 Claims, 6 Drawing Sheets

(58) Field of Classification Search
CPC ............ H04B 7/0805; H04L 25/03343; H04L 25/497; H04L 25/03057; H04W 52/42; H04W 16/28; H04M 1/00
USPC .................................. 375/259–285, 316–352
See application file for complete search history.

(56) References Cited

U.S. PATENT DOCUMENTS

| | | | | |
|---|---|---|---|---|
| 8,098,713 | B2* | 1/2012 | Baxley | H04B 1/59 370/500 |
| 8,553,670 | B2* | 10/2013 | Hirakawa | H04B 7/0697 370/344 |
| 8,674,879 | B2* | 3/2014 | Nilsson | G01S 3/043 342/417 |
| 8,768,248 | B2* | 7/2014 | Sadr | G06K 7/0008 455/41.1 |
| 9,014,635 | B2* | 4/2015 | Sadr | G06K 7/0008 455/41.2 |
| 9,344,176 | B2* | 5/2016 | Barker | H04B 7/0617 |
| 9,544,036 | B2* | 1/2017 | Peterson | H04B 7/0617 |
| 9,614,604 | B2* | 4/2017 | Sadr | G06K 7/0008 |
| 9,654,264 | B2* | 5/2017 | Athley | H04L 5/0048 |
| 9,680,541 | B2* | 6/2017 | Jiang | H04L 1/0026 |
| 9,838,184 | B2* | 12/2017 | Kang | H04B 7/0626 |
| 9,843,423 | B2* | 12/2017 | Kang | H04B 7/0617 |
| 9,866,303 | B2* | 1/2018 | Ko | H04B 7/0456 |
| 9,867,060 | B2* | 1/2018 | Inoue | H04W 16/28 |
| 9,876,548 | B2* | 1/2018 | Vook | H04B 7/0478 |
| 9,900,068 | B2* | 2/2018 | Park | H04B 7/0469 |
| 9,960,828 | B2* | 5/2018 | Petersson | H04B 7/0617 |
| 9,967,013 | B2* | 5/2018 | Kang | H04B 7/0617 |
| 10,056,956 | B2* | 8/2018 | Rahman | H04B 7/0417 |
| 10,211,900 | B2* | 2/2019 | Petersson | H04B 7/0617 |
| 2004/0178951 | A1* | 9/2004 | Ponsford | G01S 3/74 342/192 |
| 2008/0012710 | A1* | 1/2008 | Sadr | G06K 7/0008 340/572.1 |
| 2008/0030422 | A1* | 2/2008 | Gevargiz | H01Q 1/2216 343/860 |
| 2011/0090059 | A1* | 4/2011 | Sadr | G06K 7/0008 340/10.1 |
| 2012/0288022 | A1* | 11/2012 | Guey | H04B 7/0691 375/267 |
| 2013/0039349 | A1* | 2/2013 | Ebrahimi Tazeh Mahalleh | H04L 1/0013 370/336 |
| 2013/0044650 | A1* | 2/2013 | Barker | H04B 7/0617 370/278 |
| 2013/0083681 | A1* | 4/2013 | Ebrahimi Tazeh Mahalleh | H04L 5/0057 370/252 |
| 2013/0242773 | A1* | 9/2013 | Wernersson | H04B 7/024 370/252 |
| 2013/0272151 | A1* | 10/2013 | Thomas | H04W 24/02 370/252 |
| 2013/0278463 | A1* | 10/2013 | Nilsson | G01S 3/043 342/417 |
| 2013/0308715 | A1* | 11/2013 | Nam | H04B 7/0469 375/267 |
| 2014/0016549 | A1* | 1/2014 | Novlan | H04B 7/0417 370/328 |
| 2014/0098689 | A1* | 4/2014 | Lee | H04B 7/0469 370/252 |
| 2014/0219377 | A1* | 8/2014 | Guey | H04B 7/0691 375/267 |
| 2014/0292492 | A1* | 10/2014 | Sadr | G06K 7/0008 340/10.1 |
| 2015/0236828 | A1* | 8/2015 | Park | H04L 5/0094 375/340 |
| 2015/0288499 | A1* | 10/2015 | Nam | H04L 1/0026 370/329 |
| 2015/0326297 | A1* | 11/2015 | Petersson | H04B 7/0617 370/329 |
| 2015/0326298 | A1* | 11/2015 | Sadr | G06K 7/0008 340/10.1 |
| 2015/0326299 | A1* | 11/2015 | Petersson | H04B 7/0617 370/329 |
| 2015/0333884 | A1* | 11/2015 | Athley | H04L 5/0048 375/295 |
| 2015/0333885 | A1* | 11/2015 | Athley | H04L 5/0048 375/219 |
| 2015/0341091 | A1* | 11/2015 | Park | H04B 7/0456 375/267 |
| 2015/0341093 | A1* | 11/2015 | Ji | H04B 1/707 375/267 |
| 2015/0341099 | A1* | 11/2015 | Kang | H04B 7/0626 375/267 |
| 2015/0341152 | A1* | 11/2015 | Kim | H04W 24/00 370/329 |
| 2016/0006493 | A1* | 1/2016 | Chen | H04B 7/0456 375/267 |
| 2016/0021551 | A1* | 1/2016 | Park | H04B 7/0619 370/328 |
| 2016/0028519 | A1* | 1/2016 | Wei | H04B 7/0456 375/267 |
| 2016/0056875 | A1* | 2/2016 | Kang | H04B 7/0456 370/329 |
| 2016/0080052 | A1* | 3/2016 | Li | H04B 7/0456 375/267 |
| 2016/0080058 | A1* | 3/2016 | Kang | H04B 7/0617 370/329 |
| 2016/0165457 | A1* | 6/2016 | Inoue | H04W 16/28 455/562.1 |
| 2016/0170019 | A1* | 6/2016 | Owirka | G01S 13/9029 342/25 B |
| 2016/0191128 | A1* | 6/2016 | Jiang | H04L 1/0026 375/267 |
| 2016/0192229 | A1* | 6/2016 | Liu | H04L 1/0026 455/423 |
| 2016/0211900 | A1* | 7/2016 | Athley | H04L 5/0048 |
| 2016/0212643 | A1* | 7/2016 | Park | H04B 7/0626 |
| 2016/0261326 | A1* | 9/2016 | Barker | H04B 7/0617 |
| 2016/0344525 | A1* | 11/2016 | Kang | H04B 7/0469 |
| 2016/0359538 | A1* | 12/2016 | Onggosanusi | H04B 7/0469 |
| 2016/0365990 | A1* | 12/2016 | Yum | H04L 25/0204 |
| 2016/0373224 | A1* | 12/2016 | Kim | H04B 7/0469 |
| 2016/0380734 | A1* | 12/2016 | Wang | H04L 5/0057 370/329 |
| 2017/0012346 | A1* | 1/2017 | Athley | H04B 7/10 |
| 2017/0019159 | A1* | 1/2017 | Vook | H04B 7/0478 |
| 2017/0070277 | A1* | 3/2017 | Si | H04B 7/0413 |
| 2017/0117947 | A1* | 4/2017 | Petersson | H04B 7/0617 |
| 2017/0177911 | A1* | 6/2017 | Sadr | G06K 7/0008 |
| 2017/0195017 | A1* | 7/2017 | Kim | H04B 7/0417 |
| 2017/0244533 | A1* | 8/2017 | Onggosanusi | H04B 7/0478 |
| 2017/0250745 | A1* | 8/2017 | Athley | H04L 5/0048 |
| 2017/0279514 | A1* | 9/2017 | Rahman | H04B 7/0469 |
| 2017/0310378 | A1* | 10/2017 | Kim | H04B 7/04 |
| 2017/0331670 | A1* | 11/2017 | Parkvall | H04W 52/0274 |
| 2017/0352953 | A1* | 12/2017 | Petersson | H04B 7/0617 |
| 2018/0006845 | A1* | 1/2018 | Kim | H04B 7/0478 |
| 2018/0026367 | A1* | 1/2018 | Athley | H04B 7/0617 342/373 |
| 2018/0026693 | A1* | 1/2018 | Petersson | H04B 7/0617 375/295 |
| 2018/0041260 | A1* | 2/2018 | Seifi | H04B 7/0469 |
| 2018/0041264 | A1* | 2/2018 | Ko | H04B 7/0469 |
| 2018/0083681 | A1* | 3/2018 | Faxer | H04B 7/0413 |
| 2018/0098234 | A1* | 4/2018 | Kim | H04L 5/0053 |
| 2018/0102817 | A1* | 4/2018 | Park | H04B 7/04 |
| 2018/0115357 | A1* | 4/2018 | Park | H04B 7/04 |
| 2018/0123668 | A1* | 5/2018 | Kwak | H04B 7/0626 |

(56) References Cited

U.S. PATENT DOCUMENTS

2018/0124761 A1\* 5/2018 Athley .................. H04B 7/0617
2018/0152324 A1\* 5/2018 Park ..................... H04B 17/309
2018/0316402 A1\* 11/2018 Jalden ................. H04B 7/0617
2018/0348328 A1\* 12/2018 Athley ................... G01S 3/043

OTHER PUBLICATIONS

Friedlander, Benjamin; "Direction Finding Using an Interpolated Array"; Published in Acoustics, Speech, and Signal Processing, 1990. ICASSP-90., 1990 International Conference on Apr. 3-6, 1990 in Alburquerque, NM, USA; pp. 2951-2954, consisting of 4-pages.

Moffet, Alan T. ; "Minimum-Redundancy Linear Arrays"; IEEE Transactions on Antennas and Propagation, vol. Ap-16, No. 2, Mar. 1968, pp. 172-175, consisting of 4-pages.

Friedlander et al.; "Direction Finding for Wide-Band Signals Using an Interpolated Array"; IEEE Transactions on Signal Processing, vol. 41, No. 4; pp. 1618-1634, Apr. 1993, consisting of 17-pages.

\* cited by examiner

Fig. 3
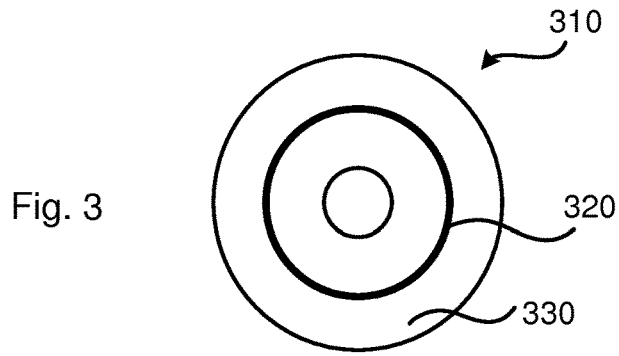
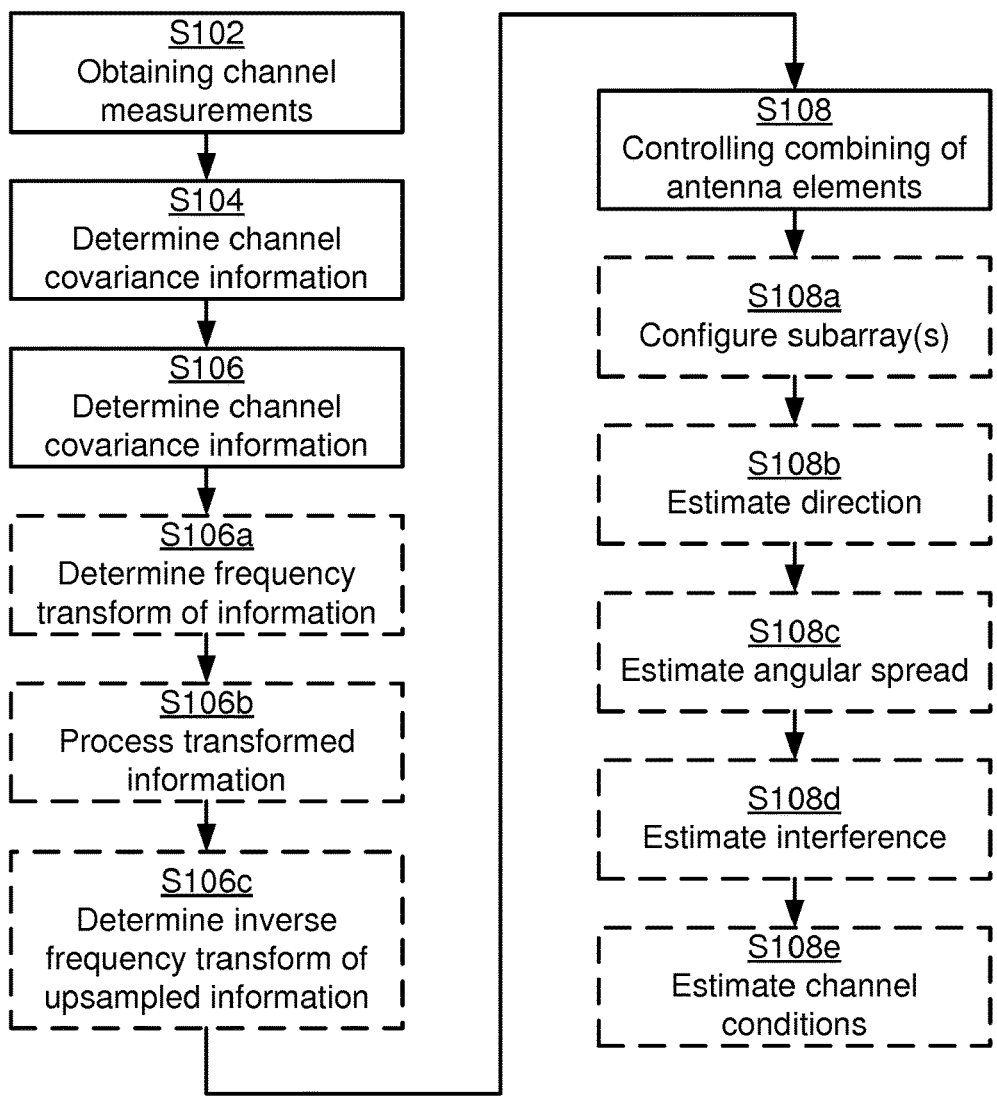
Fig. 5

ANTENNA SYSTEM CONFIGURATION

CROSS-REFERENCE TO RELATED APPLICATIONS

This application is a Submission Under 35 U.S.C. § 371 for U.S. National Stage Patent Application of International Application Number: PCT/EP2015/077310, filed Nov. 23, 2015 entitled "ANTENNA SYSTEM CONFIGURATION," the entirety of which is incorporated herein by reference.

TECHNICAL FIELD

Embodiments presented herein relate to a method, a network device, a computer program, and a computer program product for configuring an antenna system.

BACKGROUND

In communications networks, there may be a challenge to obtain good performance and capacity for a given communications protocol, its parameters and the physical environment in which the communications network is deployed.

For example, efficient use of the available resources is needed in order to provide ubiquitous high data-rate coverage. Using multiple antennas at the transmitter and/or at the receiver could make it possible to exploit the spatial degrees of freedom offered by multipath fading inside the wireless channel in in a wireless communications network in order to provide high data rates and reliability of wireless transmission. In general terms, in the downlink (i.e., transmission from network to wireless device), there are three basic approaches for utilizing the antenna: diversity, multiplexing, and beamforming. With beamforming, the radiation pattern of the antennas may be controlled by transmitting a signal from a plurality of antenna elements with an antenna element specific gain and phase. In this way, radiation patterns with different pointing directions and beam widths in both elevation and azimuth directions may be created.

Existing so-called macro antennas comprises multiple radiating antenna elements. These antenna elements can be passively combined in order to generate a narrow transmission beam with high gain to supply coverage at cell borders of large cells. Some antenna arrays have the possibility to change the phase between the individual antenna elements in order to change the tilt of the antenna beam pattern, referred to as remote electrical tilt (RET). This change of tilt is however relatively slow, and is only performed to generate a beam pattern that is good for all, or at least the majority, of the wireless devices within the cell. Optimizing the tilt (cell shape) for the intended wireless devices in the cell may be cumbersome, since the radio access network node providing network access in the cell does not know where the wireless devices are located in the cell. Not being able to measure where the signals from the wireless devices come from results in such optimization methods becoming blind. State of the art mechanisms for optimizing the cell specific beamforming, so called reconfigurable antenna system (RAS) self-organizing network (SON) algorithms, hence utilize trial and error methods wherein different settings are evaluated for a period of time, and the best setting is chosen. Such procedures may then be run continuously in different parts of the communications network, so as to iteratively improve the network settings. One issue with such mechanisms is that they are slow, and may temporarily decrease network performance when evaluating non-optimal tilt-settings.

Using active antenna arrays, with individual access to each radiating antenna element, makes it possible to estimate spatial channel characteristics, such as direction of arrival (DoA) to each wireless device, angular spread etc. By utilizing knowledge of the propagation channel as well as the structure of the antenna array it is possible to form narrow beams to each wireless device and thus obtain high received power for each wireless device, so called device specific beamforming. Radiating the majority of the energy in/towards the intended wireless device (or wireless devices), whilst minimizing the radiated power elsewhere not only increases the received power for the intended wireless device (or wireless devices) but also decreases the interference generated.

Using active antenna arrays with one radio per antenna element may however be costly. The antenna array may therefore be split into multiple antenna subarrays, where each antenna subarray is connected to a transceiver unit, with a feeding network. In certain implementations, each subarray is fed by one network and the feeding network within one antenna subarray is passive. This approach with antenna subarray splitting would maintain the maximum antenna array gain; however, the area where this gain is achievable is limited by the antenna radiation pattern from the subarray, as well as the observability on the measured antenna subarray ports.

Hence, there is still a need for an improved control of an antenna system.

SUMMARY

An object of embodiments herein is to provide efficient configuration of an antenna system.

According to a first aspect there is presented a method for configuring an antenna system comprising individual antenna elements arranged in at least two antenna subarrays. Each pair of antenna subarrays has a respective first spatial separation. Each pair of the individual antenna elements has a respective second spatial separation. The method is performed by a network device. The method comprises obtaining channel measurements for each of the at least two antenna subarrays. The method comprises determining channel covariance information between the subarrays using the obtained channel measurements. The method comprises determining channel covariance information between all individual antenna elements of the antenna system by interpolating the channel covariance information between the subarrays according to a spatial relation between all first spatial separations and all second spatial separations. The method comprises controlling combining of the individual antenna elements of the antenna system based on the determined channel covariance information between all the individual antenna elements.

According to a second aspect there is presented a network device for configuring an antenna system comprising individual antenna elements arranged in at least two antenna subarrays. Each pair of antenna subarrays has a respective first spatial separation. Each pair of the individual antenna elements has a respective second spatial separation. The network device comprises processing circuitry. The processing circuitry is configured to cause the network device to obtain channel measurements for each of the at least two antenna subarrays. The processing circuitry is configured to cause the network device to determine channel covariance information between the subarrays using the obtained channel measurements. The processing circuitry is configured to cause the network device to determine channel covariance information between all individual antenna elements of the antenna system by interpolating the channel covariance information between the subarrays according to a spatial relation between all first spatial separations and all second spatial separations. The processing circuitry is configured to cause the network device to control combining of the individual antenna elements of the antenna system based on the determined channel covariance information between all the individual antenna elements.

According to a third aspect there is presented a network device for configuring an antenna system comprising individual antenna elements arranged in at least two antenna subarrays. Each pair of antenna subarrays has a respective first spatial separation. Each pair of the individual antenna elements has a respective second spatial separation. The network device comprises processing circuitry. The network device comprises a computer program product storing instructions that, when executed by the processing circuitry, causes the network device to perform a set of operations, or steps. One operation, or step, involves obtaining channel measurements for each of the at least two antenna subarrays. One operation, or step, involves determining channel covariance information between the subarrays using the obtained channel measurements. One operation, or step, involves determining channel covariance information between all individual antenna elements of the antenna system by interpolating the channel covariance information between the subarrays according to a spatial relation between all first spatial separations and all second spatial separations. One operation, or step, involves controlling combining of the individual antenna elements of the antenna system based on the determined channel covariance information between all the individual antenna elements.

According to a fourth aspect there is presented a network device for configuring an antenna system comprising individual antenna elements arranged in at least two antenna subarrays. Each pair of antenna subarrays has a respective first spatial separation. Each pair of the individual antenna elements has a respective second spatial separation. The network device comprises processing circuitry. The network device comprises an obtain module configured to obtain channel measurements for each of the at least two antenna subarrays. The network device comprises a determine module configured to determine channel covariance information between the subarrays using the obtained channel measurements. The determine module is further configured to determine channel covariance information between all individual antenna elements of the antenna system by interpolating the channel covariance information between the subarrays according to a spatial relation between all first spatial separations and all second spatial separations. The network device comprises control module configured to control combining of the individual antenna elements of the antenna system based on the determined channel covariance information between all the individual antenna elements.

According to a fifth aspect there is presented a computer program for configuring an antenna system, the computer program comprising computer program code which, when run on a network device, causes the network device to perform a method according to the first aspect.

According to a sixth aspect there is presented a computer program product comprising a computer program according to the fifth aspect and a computer readable storage medium on which the computer program is stored. The computer readable storage medium can be a non-transitory computer readable storage medium.

Advantageously this method, these network devices, this computer program, and this computer program product provides efficient configuration of an antenna system.

Advantageously, determining channel covariance information between all individual antenna elements of the antenna system by interpolating the channel covariance information between the subarrays according to a spatial relation between all first spatial separations and all second spatial separations above enables digital beamforming over antenna arrays without the need for costly baseband access. This in turn increases the gains of multi antenna systems without increasing the signaling overhead.

Advantageously, control combining of the individual antenna elements of the antenna system can be performed on a more rapid time basis than currently used slow trial and error RAS-SON mechanisms for optimizing subarray patterns.

It is to be noted that any feature of the first, second, third, fourth, fifth and sixth aspects may be applied to any other aspect, wherever appropriate. Likewise, any advantage of the first aspect may equally apply to the second, third, fourth, fifth, and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 3 shows one example of a computer program product comprising computer readable storage medium according to an embodiment;

FIGS. 4 and 5 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers refer to like elements throughout the description. Any step or feature illustrated by dashed lines should be regarded as optional.

Figure 1:
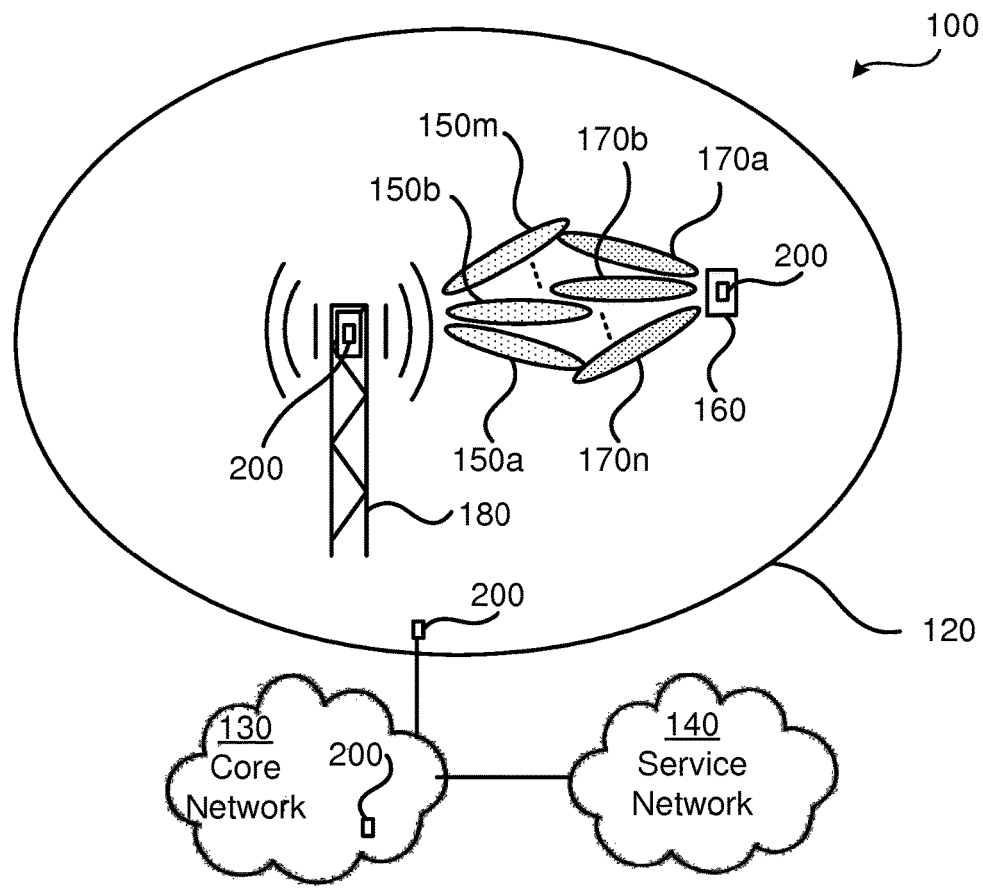
FIG. 1 is a schematic diagram illustrating a communication network according to embodiments.

FIG. 1 is a schematic diagram illustrating a communications network 100 where embodiments presented herein can be applied.

The communications network 100 comprises at least one network device 200. The at least one network device 200 may be provided in, or installed on, a radio access network node 180 or in another entity or device in a radio access network 120, in an entity or device of a core network 130, or in an entity. Additionally or alternatively, the network device 200 may be provided in, or installed on, a wireless device 160.

The radio access network node 180 is operatively connected to a core network 130, which, in turn, is operatively connected to a service providing network 140. The radio access network node 180 provides network access to at least one wireless device 160. The wireless device 160 may thereby access services and exchange data with entities of the core network 130 and the service network 140.

The network device 200 of the radio access network node 180 is configured to cause the antenna system of the radio access network node 180 to transmit and receive radio signals in directional beams 150a, 150b, ..., 150n where m is an arbitrary large positive integer. The network device 200 of the wireless device 160 is configured to cause the antenna system of the wireless device 160 to transmit and receive radio signals in directional beams 170a, 170b, ..., 170n where n is an arbitrary large positive integer. Further functionality of the network device 200 will be disclosed below.

Examples of wireless devices 160 include, but are not limited to, mobile stations, mobile phones, handsets, wireless local loop phones, user equipment (UE), smartphones, laptop computers, and tablet computers, wireless modems, sensor devices, and Internet of Things devices. According to an embodiment there is provided a wireless device 160 comprising a network device 200 as herein disclosed.

Examples of radio access network nodes 180 include, but are not limited to, radio base stations, base transceiver stations, node Bs, evolved node Bs, and access points. According to an embodiment there is provided a radio access network node 180 comprising a network device 200 as herein disclosed.

As the skilled person understands, the communications network 100 may comprise a plurality of radio access network nodes 180, each providing network access to a plurality of wireless devices 160. The herein disclosed embodiments are not limited to any particular number of radio access network nodes 180, network devices 200, or wireless devices 160.

The embodiments disclosed herein relate to configuration of an antenna system. In order to obtain such configuration there is provided a network device 200, a method performed by the network device 200, a computer program product comprising code, for example in the form of a computer program, that when run on a network device 200, causes the network device 200 to perform the method.

Figures 2A, 2B:
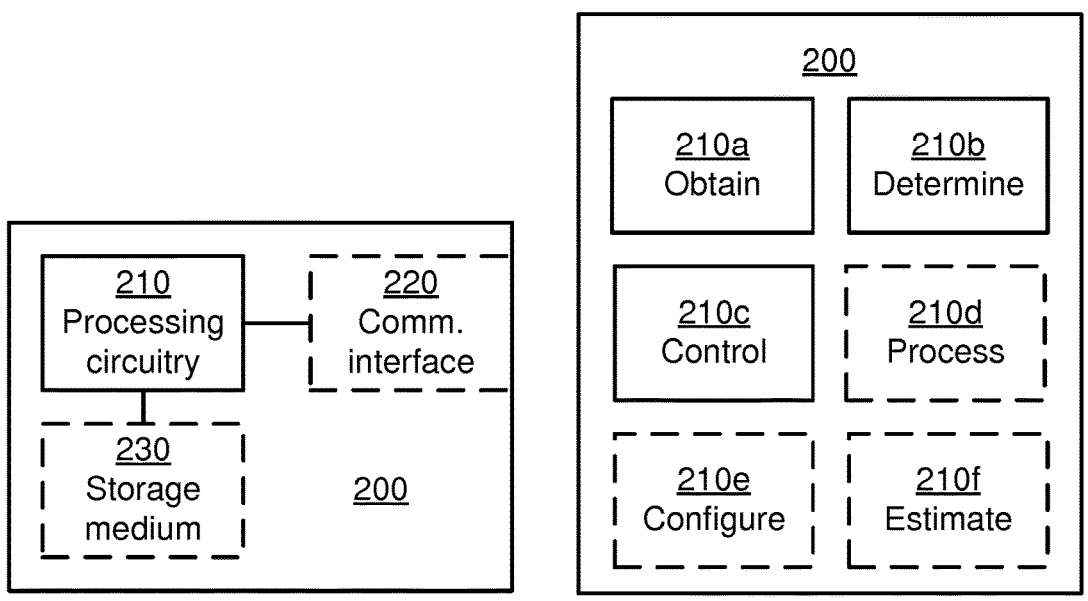
FIG. 2a is a schematic diagram showing functional units of a network device according to an embodiment.
FIG. 2b is a schematic diagram showing functional modules of a network device according to an embodiment.

FIG. 2a schematically illustrates, in terms of a number of functional units, the components of a network device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 310 (as in FIG. 3), e.g. in the form of a storage medium 230. The processing circuitry 210 may further be provided as at least one application specific integrated circuit (ASIC), or field programmable gate array (FPGA).

Particularly, the processing circuitry 210 is configured to cause the network device 200 to perform a set of operations, or steps, S102-S108e. These operations, or steps, S102-S108e will be disclosed below. For example, the storage medium 230 may store the set of operations, and the processing circuitry 210 may be configured to retrieve the set of operations from the storage medium 230 to cause the network device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The network device 200 may further comprise a communications interface 220 for communications at least with an antenna system. As such the communications interface 220 may comprise one or more transmitters and receivers, comprising analogue and digital components. The processing circuitry 210 controls the general operation of the network device 200 e.g. by sending data and control signals to the communications interface 220 and the storage medium 230, by receiving data and reports from the communications interface 220, and by retrieving data and instructions from the storage medium 230. Other components, as well as the related functionality, of the network device 200 are omitted in order not to obscure the concepts presented herein.

FIG. 2b schematically illustrates, in terms of a number of functional modules, the components of a network device 200 according to an embodiment. The network device 200 of FIG. 2b comprises a number of functional modules; an obtain module 210a configured to perform below step S102, a determine module 210b configured to perform below steps S104, S106, S106a, S106c, and a control module 210c configured to perform below step S108. The network device 200 of FIG. 2b may further comprises a number of optional functional modules, such as any of a process module 210d configured to perform below step S106b, a configure module 210e configured to perform below step S108a, and an estimate module 210f configured to perform below steps S108b, S108c, S108d, S108e. The functionality of each functional module 210a-210f will be further disclosed below in the context of which the functional modules 210a-210f may be used. In general terms, each functional module 210a-210f may in one embodiment be implemented only in hardware or and in another embodiment with the help of software, i.e., the latter embodiment having computer program instructions stored on the storage medium 230 which when run on the processing circuitry makes the network device 200 perform the corresponding steps mentioned above in conjunction with FIG. 2b. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with functional units 220 and/or 230. The processing circuitry 210 may thus be configured to from the storage medium 230 fetch instructions as provided by a functional module 210a-210f and to execute these instructions, thereby performing any steps as will be disclosed hereinafter.

Figure 2C:
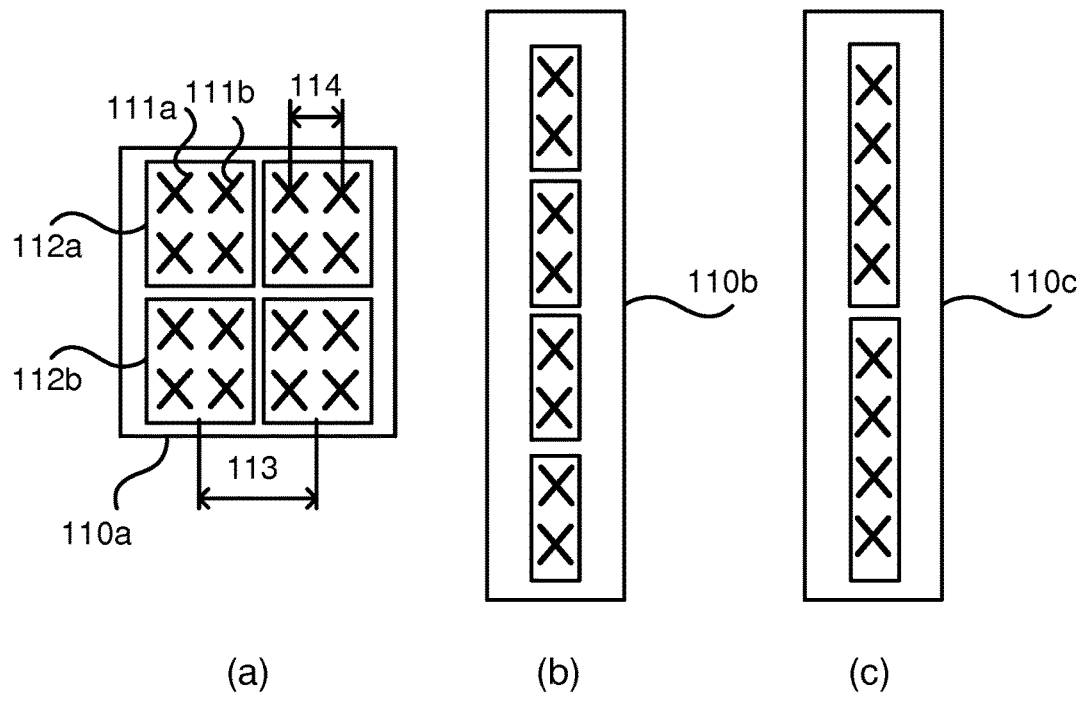
FIGS. 2c and 2d are schematic diagrams of antenna systems according to embodiments.

FIG. 2c at (a), (b), and (c) schematically illustrates examples of antenna systems 110a, 110b, 110c. The antenna systems 110a, 110b, 110c comprise individual antenna elements, two of which are identified at reference numerals 112a, 112b. The individual antenna elements 111a, 111b are arranged in at least two antenna subarrays, two of which are identified at reference numerals 112a, 112b. Each pair of antenna subarrays 112a, 112b (i.e., each combination of two antenna subarrays 112a, 112b) has a respective first spatial separation 113. Each pair of the individual antenna elements 111a, 111b (i.e., each combination of two individual antenna elements 111a, 111b) has a respective second spatial separation 114. It should here be noted that the first spatial separation 113 and/or the second spatial separation 114 may be different in vertical and horizontal directions, respectively. Hence, the first spatial separation 113 can represent a separation in vertical direction and/or in horizontal direction. Likewise, the second spatial separation 114 can represent a separation in vertical direction and/or in horizontal direction.

The first spatial separations can define how all of the at least two subarrays are stacked relative each other in the antenna system. It is here noted that not all separations between the at least two subarrays need to be equal.

The second spatial separations can define how all individual antenna elements of the antenna system are stacked relative each other in the antenna system. It is here noted that not all separations between the individual antenna elements need to be equal.

Figure 2D:
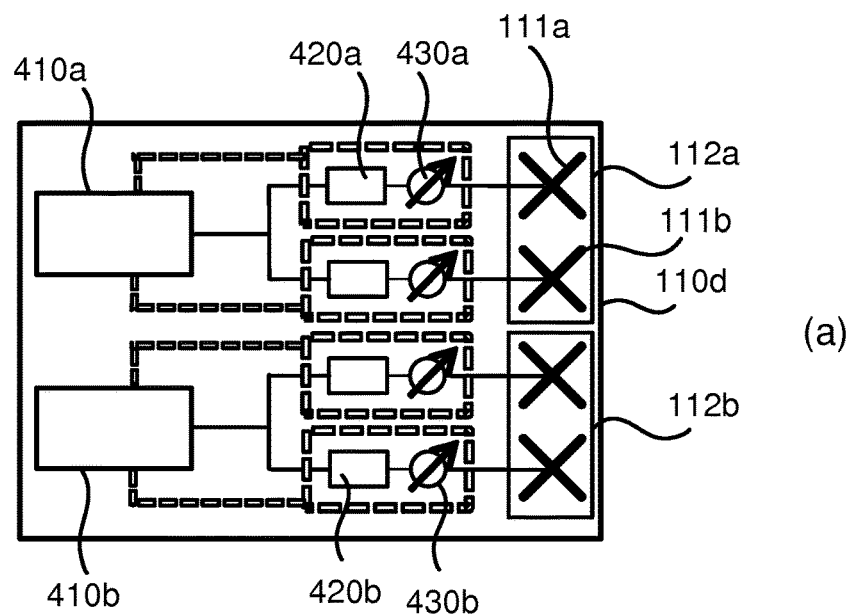
Figure 2D:
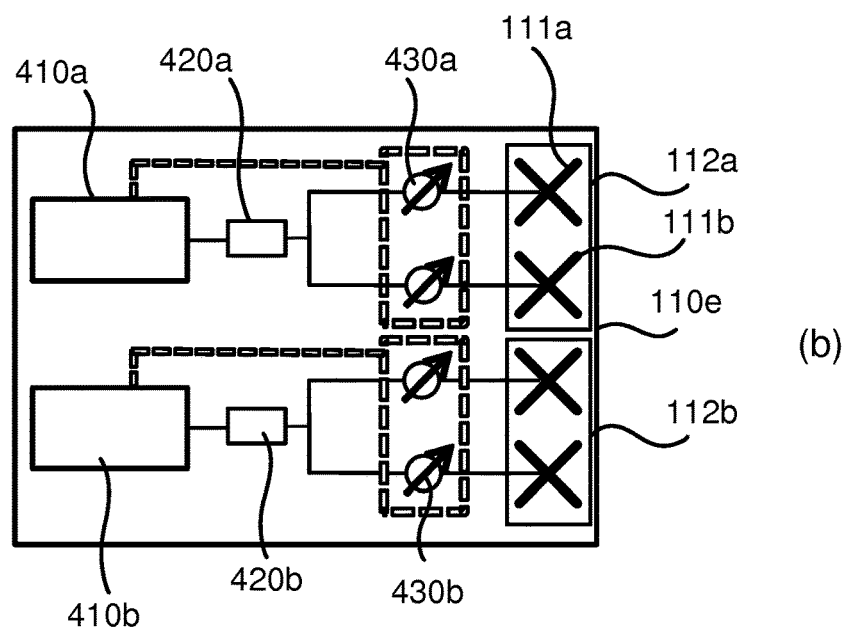

FIG. 2d at (a) and (b) schematically illustrates antenna systems 110d, 110e comprising two radio chains 410a, 410b each. Each radio chain 410a, 410b feeds one antenna subarray 112a, 112b. Each of the antenna elements 111a, 111b can be operatively connected to entities that may be able to adjust phase and amplitude, such as at least one of a respective amplifier 420a, 420b, and phase-shifter and/or filter 430a, 430b. In this respect, all antenna elements 111a, 111b could be fed by one common power amplifier 420a, 420b but each antenna element 111a, 111b could have their own filter/phase-shifter 430a, 430b. This enables large freedom in shaping the beam radiated from the antenna system. In such a scenario, precoding can be performed a by phase-taper. As a further example, all antenna elements could be fed by one common power amplifier, but each antenna elements have their own adjustable filter that reduce the effectively radiated power. Further, consider an implementation where each of the amplifiers and phase-shifters has an external input to control their state. This would allow for individual control the amplitude and phase, which is what is needed for arbitrary beamforming.

FIG. 3 shows one example of a computer program product 310 comprising computer readable storage medium 330. On this computer readable storage medium 330, a computer program 320 can be stored, which computer program 320 can cause the processing circuitry 210 and thereto operatively coupled entities and devices, such as the communications interface 220 and the storage medium 230, to execute methods according to embodiments described herein. The computer program 320 and/or computer program product 310 may thus provide means for performing any steps as herein disclosed.

In the example of FIG. 3, the computer program product 310 is illustrated as an optical disc, such as a CD (compact disc) or a DVD (digital versatile disc) or a Blu-Ray disc. The computer program product 310 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 320 is here schematically shown as a track on the depicted optical disk, the computer program 320 can be stored in any way which is suitable for the computer program product 310.

Figure 4:
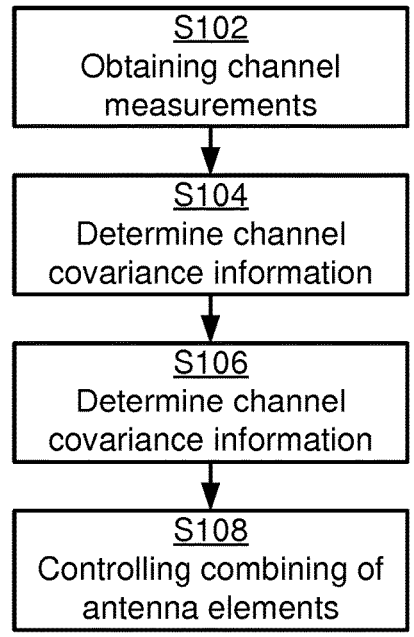
Figure 6:
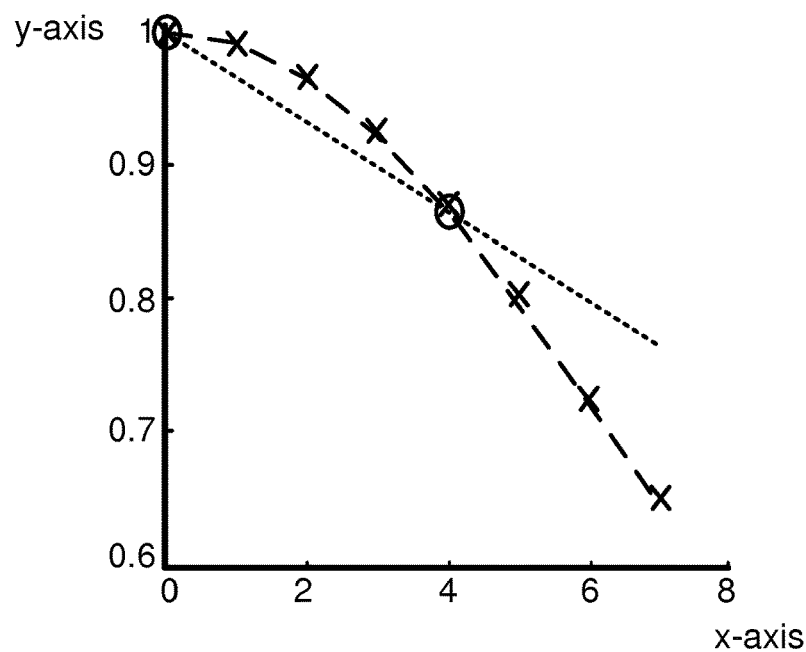
FIG. 6 show simulation results.

FIGS. 4, 5, and 6 are flow chart illustrating embodiments of methods for configuring an antenna system 110, 110a, . . . , 110k. The methods are performed by the network device 200. The methods are advantageously provided as computer programs 320.

Reference is now made to FIG. 4 illustrating a method for configuring an antenna system 110, 110a, . . . , 110k as performed by the network device 200 according to an embodiment.

The method for configuring an antenna system 110, 110a, . . . , 110k involves utilizing information about how the antenna subarrays 112a, 112b are stacked as well as information about how the individual antenna elements 111a, 111b are stacked within an antenna subarray 112a, 112b to interpolate spatial channel information, facilitating the same information as would have been obtainable in a fully active antenna array implementation. The information of the antenna array structure (i.e., information of the respective first spatial separations 113 and the respective second spatial separations 114) may be provided a construction or deployment of the antenna.

The network device 200 is configured to, in a step S102, obtain channel measurements for each of the at least two antenna subarrays 112a, 112b. This can be achieved by measuring the signal on each of the antenna subarrays 112a, 112b (that is by design fed by one radio chain each). In this step, for a network device 200 configured to tune the phase (and possibly amplitude) arbitrary, it is possible to use wide-beam beamforming mechanisms in order to remove effects of spatial filtering through the antenna subarray pattern. However, for relatively small subarrays the spatial filtering effect is negligible.

The network device 200 is configured to, in a step S104, determine channel covariance information between the subarrays 112a, 112b using the obtained channel measurements. By utilizing the information of how the antenna subarrays 112a, 112b are stacked relative each other covariance information for the separation distances between the antenna subarrays 112a, 112b as given by the subarray positions may thus be obtained.

Further, by utilizing the information of the positions of the individual antenna elements 111a, 111b within each antenna subarray 112a, 112b it may be deduced for which separation distances the covariance information is needed. The covariance information determined in step S104 can thus be interpolated for each distance separation. Hence, the network device 200 is configured to, in a step S106, determine channel covariance information between all individual antenna elements 111a, 111b of the antenna system 110, 110a, . . . , 110k by interpolating the channel covariance information between the subarrays 112a, 112b according to a spatial relation between all first spatial separations and all second spatial separations.

The passive feeding network of the antenna system 110, 110a, . . . , 110k can then, based on the information in the interpolated covariance information, be configured to comply with sought functionality. The network device 200 is therefore configured to, in a step S108, control combining of the individual antenna elements 111a, 111b of the antenna system 110, 110a, . . . , 110k based on the determined channel covariance information between all the individual antenna elements 111a, 111b.

Knowledge of the spatial characteristics and the correlation information between all antenna elements within a subarray, and thus between all antenna elements of the full antenna array, thereby enables to shape the beam pattern of the antenna system.

This method thus provides a tractable means for exploiting potential gains of antenna arrays that are built up by multiple antenna subarrays. The method utilizes information of the spatial separation of the subarrays as well as the spatial separation of the individual antenna elements within an antenna subarray, to interpolate the spatial channel characteristics between all radiating antenna elements (even between antenna elements that may not be measured directly). The information obtained may then be used to control the subarray antenna pattern which enables non-blind subarray antenna pattern optimization and less constrained device specific beamforming.

Further knowledge of the correlation information between all antenna elements within a subarray allows for shaping the pattern radiated by a subarray without blind trial-and-error mechanisms. This facilitates fast cell-shaping and tractable beam forming mechanisms. Thus, according to the herein disclosed embodiments, the antenna array with sub-array partitioning would be capable of device specific beam-forming as well as cell specific beam forming with the same degrees of freedom as a fully dynamic advanced antenna array (i.e., an antenna array that has baseband access to each of the antenna elements).

Embodiments relating to further details of configuring an antenna system 110, 110a, . . . , 110k will now be disclosed.

The spatial relation between all first spatial separations and all second spatial separations can define separation distances of the individual antenna elements. The covariance information can then be determined for the separation distances.

Reference is now made to FIG. 5 illustrating methods for configuring an antenna system 110, 110a, . . . , 110k as performed by the network device 200 according to further embodiments.

It should be noted that to estimate the spatial channel information in a certain direction, observability (multiple antenna subarrays) is needed in that dimension. Hence, for the example antenna systems 110a, 110b, 110c in FIG. 2c, this means that for the antenna subarray in (a) the spatial channel characteristics can be estimated in both horizontal (azimuth) and vertical (elevation) direction, whereas for the antenna subarrays in (b) and (c) the spatial channel characteristics can only be estimated in the vertical domain.

There may be different examples of channel measurements. For example, each of the channel measurements for each antenna subarray of the at least two antenna subarrays can represent a measurement of received signal amplitude at the antenna system and/or a measurement of received signal phase at the antenna system.

Information such as DoA and/or direction of departure (DoD) etc. may be estimated through the covariance information. The covariance information may comprise more information, such as the angular spread of the channel, than only the DoA and DoD. The spatial channel characteristics is similar for the uplink and downlink also in frequency division duplex (FDD) systems. Therefore, covariance based information derived from uplink measurements could be used for downlink transmissions in time division duplex (TDD) systems as well as FDD systems since the herein disclosed embodiments do not rely on utilizing the small scale fading characteristics of the channel. Hence, the herein disclosed embodiments are applicable to both TDD and FDD systems.

There may be different examples of covariance information. The entries of the covariance information can be complex-valued, hence complex estimation methods may be considered. For example, the covariance information can comprise amplitude values and phase values, and the amplitude values and the phase values can be interpolated separately. This may be a tractable implementation since the amplitude typically varies slower than the phase as a function of distance separation between antenna elements. For the phase there may be an ambiguity to the angle depending on the environment, the structure of the antenna array and the direction of arrival of the signal. Mechanisms to remove, or at least mitigate, the phase ambiguity will be described below.

One example of how to perform the interpolation is to use a spatial frequency transform. Hence, according to an embodiment, the network device 200 is configured to, in a step S106a, determine a spatial frequency transform of the covariance information so as to obtain transformed covariance information. The network device 200 is then configured to, in a step S106b, process the transformed covariance information according to an up-sampling factor so as to obtain up-sampled covariance information. The up-sampling factor can be determined according to the spatial relation between all first spatial separations and all second spatial separations. Up-sampling the transformed covariance information can comprise zero-padding the transformed covariance information according to the up-sampling factor. Windowing is possible for model based up-sampling. The network device 200 is then configured to, in a step S106c, determine an inverse spatial frequency transform of the up-sampled (e.g., zero-padded) transformed covariance information so as to obtain interpolated covariance information. Steps S106a-S106c can be performed as part of step S106 and hence interpolating the covariance information in step S106 can comprises the network device 200 to perform steps S106a-S106c.

The spatial frequency transform may be implemented by a fast Fourier transform (FFT), and hence the inverse spatial frequency transform may be implemented by an inverse fast Fourier transform (IFFT). One reason for this is due to the FFT being necessary for other signal processing applications commonly performed by the network device 200, and hence hardware support for such calculation is already present in the network device 200.

An example of interpolation of the amplitude of the covariance information (using a spatial frequency transform based method) for antenna array (c) in FIG. 2C is shown in FIG. 6, where correlation on the y-axis is given as a function of antenna element distance (where the distance between two neighboring antenna element is defined to have unit distance) on the x-axis. Here the circles indicate the measured covariance between the subarrays, whereas the crosses indicate the "true" covariance between each individual antenna element (not measurable). The dotted line indicates the interpolated covariance using a non-model based interpolation, and the dashed line indicates the interpolated covariance using a model based interpolation. For the model based interpolation the correlation is modelled by a Gaussian function.

In general terms, non-model based interpolation can be used where the number of subarrays is large compared to the size of the subarrays, whereas a model based interpolation can be preferred where the number of subarrays is small compared to the size of the subarrays. In general terms, for antenna arrays much larger than the antenna arrays shown in FIG. 2c, other models of covariance, asides a Gaussian function, may be more appropriate. Appropriate models may be assumed or measured once for a given antenna array structure and later be used as a-priori information in deployed sites.

One potential issue that could occur according to some of the herein disclosed embodiments, as noted above, is ambiguities in the covariance information estimates. This could typically occur when the subarrays are spaced more than $\lambda/2$ apart, where $\lambda$ denotes carrier frequency wavelength, and positioned in a periodically manner, as seen in the antenna systems 110f and 110h of FIGS. 7(a) and 8(a). One reason for the ambiguity is that the distance between phase centers of periodically positioned subarrays are too large (typically one $\lambda$ or more), which generates grating lobes. For a line-of-sight scenario this means that there will be ambiguities in the direction of arrival (DoA) estimation of the wireless device due to the grating lobes. One true direction will then give two or more other directions which have the same antenna array response as the true direction.

There may be different ways to handle ambiguities in the covariance information estimates. Different embodiments relating thereto will now be described in turn.

Figure 7:
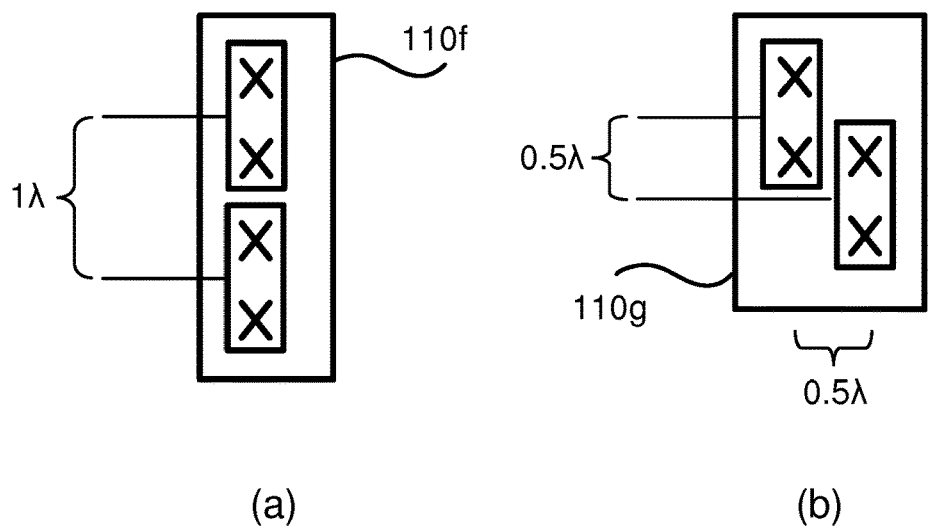
FIGS. 7, 8, 9 schematically illustrates separations of antenna subarrays according to embodiments.
Figure 8:
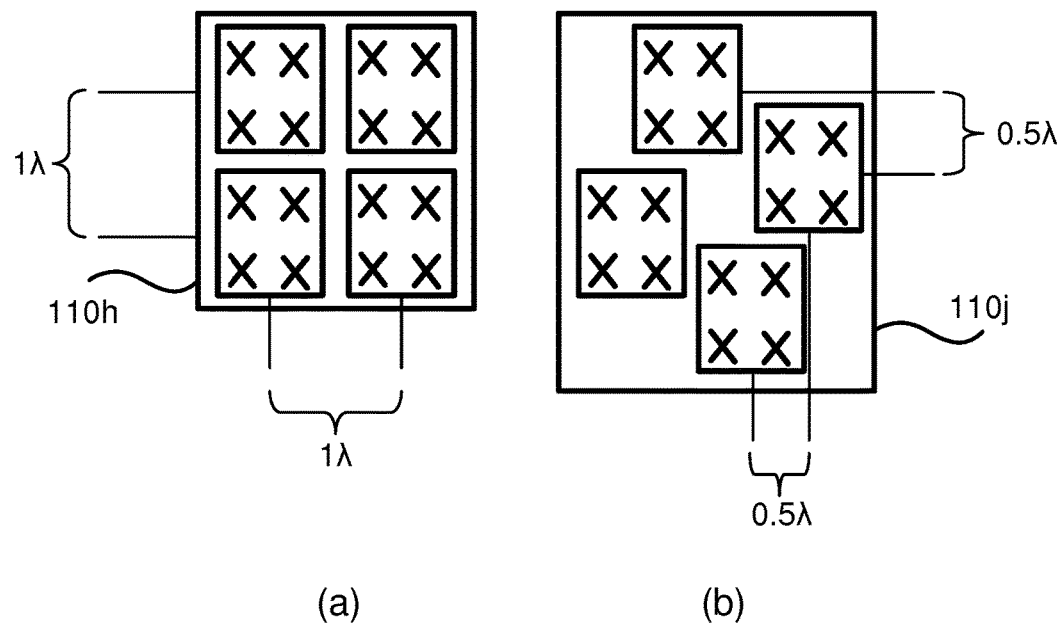

According to a first embodiment, the antenna elements of the antenna system are placed such that all subarrays are separated from each other by a factor $N \cdot \lambda/2$, where N is a positive integer. In more detail, according to this embodiment, the ambiguities are mitigated either by decreasing the separation of the subarrays or by irregular positioning of the subarrays. One example of decreased subarray separation for a vertical antenna system 110g is shown in FIG. 7(b). By interleaving the antenna element positions in adjacent antenna element columns, subarrays with a separation of $\lambda/2$ can be created. This will remove the grating lobes in the elevation plane. An example for a quadratic antenna system 110j is shown in FIG. 8(b).

Figure 9:
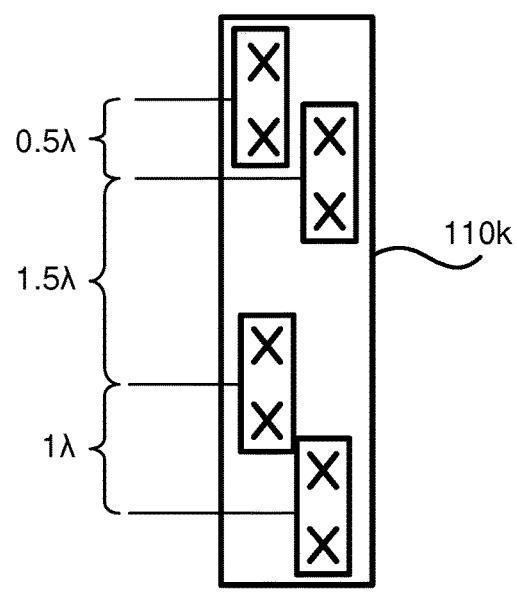

In order to increase the antenna array aperture for a given number of subarrays, sparse antenna array design principles can be used for the subarrays. For example, the minimum-redundancy design principle can be used for the phase centers of the subarrays. In a minimum-redundancy sparse antenna array, there is a minimum number of subarray pairs that have the same spatial covariance lag. For linear antenna arrays, zero redundancy exists for up to four subarrays. For larger antenna arrays, it can either be required that all spatial covariance lags exist and minimize redundancy or require zero redundancy and accept that some covariance lags are missing. Such a design will mitigate the ambiguities in sparse arrays. A zero-redundant subarray placement is shown in the antenna system 110k of FIG. 9. If the separations of all possible combinations of subarray pairs is listed, it is noted that the multiples 1, 2, . . . , 6 of $\lambda/2$ separation occur only once. Hence, there is zero redundancy.

According to a second embodiment, all antenna elements of less than all subarray of the at least two subarrays are fed by individual radio chains. In more detail, in this embodiment periodically subarray positions could be used, but one of the subarrays has one baseband port behind each antenna element, defining this subarray to be an active subarray. In this embodiment it is possible to use this active subarray to find the direction of the wireless device and hence remove the ambiguity. This increases the number of transceiver chains slightly. However the number of transceiver chains is still lower than a fully active antenna array.

According to a third embodiment, signals of different carrier frequencies are fed to each of the at least two subarrays. In this embodiment a system with multiple carrier frequencies is requires and the carrier frequencies are separated enough in frequency. By using uplink measurement data from multiple carrier frequencies the DoA estimation can be performed without ambiguity due to the fact that the single periodicity (counted in wavelengths) of the sub-array positions will be removed. The performance may depend on how the carrier frequencies are distributed in the frequency domain.

There may be different ways of controlling the individual antenna elements 111a, 111b of the antenna system 110, 110a, . . . , 110k. Different embodiments relating thereto will now be described in turn.

For example, controlling combining of the individual antenna elements 111a, 111b of the antenna system 110, 110a, . . . , 110k could comprise controlling a passive feeding network of the antenna system 110, 110a, . . . , 110k.

For example, controlling combining of the individual antenna elements 111a, 111b of the antenna system 110, 110a, . . . , 110k can involve controlling individually controllable amplifiers and phase shifters for each of the antenna elements. The individually controllable amplifiers and phase shifters can be part of the passive feeding network.

For example, the network device 200 can be configured to, in a step S108a, control combining of the individual antenna elements 111a, 111b of the antenna system 110, 110a, . . . , 110k by configuring at least one of the at least two subarrays.

For example, the network device 200 can be configured to, in a step S108b, control combining of the individual antenna elements 111a, 111b of the antenna system 110, 110a, . . . , 110k by estimating direction of at least one directional beam of the antenna system, wherein the at least one directional beam is not configurable by the at least two subarrays. This at least one directional beam is thus controllable by use of available subarrays of the antenna system 110, 110a, . . . , 110k.

For example, the network device 200 can be configured to, in a step S108c, control combining of the individual antenna elements 111a, 111b of the antenna system 110, 110a, . . . , 110k by estimating angular spread of at least one directional beam of the antenna system, wherein the at least one directional beam is not configurable by the at least two subarrays.

For example, the network device 200 can be configured to, in a step S108d, control combining of the individual antenna elements 111a, 111b of the antenna system 110, 110a, . . . , 110k by estimating interference of at least one directional beam of the antenna system, wherein the at least one directional beam is not configurable by the at least two subarrays.

For example, the network device 200 can be configured to, in a step S108e, control combining of the individual antenna elements 111a, 111b of the antenna system 110, 110a, . . . , 110k by estimating channel conditions of at least one directional beam of the antenna system, wherein the at least one directional beam is not configurable by the at least two subarrays.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for configuring an antenna system, the antenna system comprising individual antenna elements arranged in at least two antenna subarrays, each pair of antenna subarrays having a respective first spatial separation, and each pair of the individual antenna elements having a respective second spatial separation, the method being performed by a network device, the method comprising:
   obtaining channel measurements for each of the at least two antenna subarrays;
   determining channel covariance information between the antenna subarrays using the obtained channel measurements;
   determining channel covariance information between all individual antenna elements of the antenna system by interpolating the channel covariance information between the antenna subarrays according to a spatial relation between all first spatial separations and all second spatial separations; and
   configuring the antenna system by controlling combining of the individual antenna elements of the antenna system for signal communications using the antenna system, the controlling combining being based on the determined channel covariance information between all the individual antenna elements.

2. The method according to claim 1, wherein each of the channel measurements for each antenna subarray of the at least two antenna subarrays represents at least one of a measurement of received signal amplitude at the antenna system and a measurement of received signal phase at the antenna system.

3. The method according to claim 1, wherein the antenna elements of the antenna system are placed such that all antenna subarrays are separated from each other by a factor $N\cdot\lambda/2$, where N is a positive integer and where $\lambda$ denotes carrier frequency wavelength.

4. The method according to claim 3, wherein all antenna elements of less than all antenna subarrays of the at least two antenna subarrays are fed by individual radio chains.

5. The method according to claim 1, wherein signals of different carrier frequencies are fed to each of the at least two antenna subarrays.

6. The method according to claim 1, wherein the first spatial separations define how all of the at least two antenna subarrays are stacked relative each other in the antenna system.

7. The method according to claim 1, wherein each of the at least two antenna subarrays is fed by a respective radio chain in the antenna system.

8. The method according to claim 1, wherein the second spatial separations defines how all individual antenna elements of the antenna system are stacked relative each other in the antenna system.

9. The method according to claim 1, wherein each of the antenna elements is operatively connected to at least one of a respective amplifier, and phase-shifter/filter.

10. The method according to claim 1, wherein the spatial relation between all first spatial separations and all second spatial separations defines separation distances of the individual antenna elements, and wherein the covariance information is determined for the separation distances.

11. The method according to claim 1, wherein the covariance information comprises amplitude values and phase values, and wherein the amplitude values and the phase values are interpolated separately.

12. The method according to claim 1, wherein controlling combining of the individual antenna elements of the antenna system involves controlling a passive feeding network of the antenna system.

13. The method according to claim 1, wherein controlling combining of the individual antenna elements of the antenna system involves controlling individually controllable amplifiers and phase shifters for each of the antenna elements.

14. The method according to claim 12, wherein the individually controllable amplifiers and phase shifters are part of the passive feeding network.

15. The method according to claim 1, wherein controlling combining of the individual antenna elements of the antenna system comprises:
   configuring at least one of the at least two antenna subarrays.

16. The method according to claim 1, wherein controlling combining of the individual antenna elements of the antenna system comprises:
   estimating direction of at least one directional beam of the antenna system, wherein the at least one directional beam is not configurable by the at least two antenna subarrays.

17. The method according to claim 1, wherein controlling combining of the individual antenna elements of the antenna system comprises:
   estimating angular spread of at least one directional beam of the antenna system, wherein the at least one directional beam is not configurable by the at least two subarrays.

18. The method according to claim 1, wherein controlling combining of the individual antenna elements of the antenna system comprises:
   estimating interference of at least one directional beam of the antenna system, wherein the at least one directional beam is not configurable by the at least two subarrays.

19. The method according to claim 1, wherein controlling combining of the individual antenna elements of the antenna system comprises:
   estimating channel conditions of at least one directional beam of the antenna system, wherein the at least one directional beam is not configurable by the at least two subarrays.

20. A network device for configuring an antenna system, the antenna system comprising individual antenna elements arranged in at least two antenna subarrays, each pair of antenna subarrays having a respective first spatial separation, and each pair of the individual antenna elements having a respective second spatial separation, the network device comprising:
   processing circuitry, the processing circuitry being configured to cause the network device to:
      obtain channel measurements for each of the at least two antenna subarrays;
      determine channel covariance information between the subarrays using the obtained channel measurements;
      determine channel covariance information between all individual antenna elements of the antenna system by interpolating the channel covariance information between the subarrays according to a spatial relation between all first spatial separations and all second spatial separations; and configure the antenna system by controlling combining of the individual antenna elements of the antenna system for signal communications using the antenna system, the controlling combining being based on the determined channel covariance information between all the individual antenna elements.

21. A network device for configuring an antenna system, the antenna system comprising individual antenna elements arranged in at least two antenna subarrays, each pair of antenna subarrays having a respective first spatial separation, and each pair of the individual antenna elements having a respective second spatial separation, the network device comprising:
processing circuitry; and
a non-transitory computer memory storing instructions that, when executed by the processing circuitry, causes the network device to:
obtain channel measurements for each of the at least two antenna subarrays;
determine channel covariance information between the subarrays using the obtained channel measurements;
determine channel covariance information between all individual antenna elements of the antenna system by interpolating the channel covariance information between the subarrays according to a spatial relation between all first spatial separations and all second spatial separations; and
configure the antenna system by control combining of the individual antenna elements of the antenna system for signal communications using the antenna system, the controlling combining being based on the determined channel covariance information between all the individual antenna elements.

22. A non-transitory computer readable storage medium storing a computer program for configuring an antenna system, the antenna system comprising individual antenna elements arranged in at least two antenna subarrays, each pair of antenna subarrays having a respective first spatial separation, and each pair of the individual antenna elements having a respective second spatial separation, the computer program comprising computer code which, when run on processing circuitry of a network device, causes the network device to perform a method comprising:
obtaining channel measurements for each of the at least two antenna subarrays;
determining channel covariance information between the subarrays using the obtained channel measurements;
determining channel covariance information between all individual antenna elements of the antenna system by interpolating the channel covariance information between the subarrays according to a spatial relation between all first spatial separations and all second spatial separations; and
configuring the antenna system by controlling combining of the individual antenna elements of the antenna system for signal communications using the antenna system, the controlling combining being based on the determined channel covariance information between all the individual antenna elements.

* * * * *